US009124495B2

(12) United States Patent
Jagannathan et al.

(10) Patent No.: US 9,124,495 B2
(45) Date of Patent: Sep. 1, 2015

(54) SYSTEM AND METHOD FOR AUTOMATIC PROVISIONING OF STACKED SWITCHES

(71) Applicant: Dell Products L.P., Round Rock, TX (US)

(72) Inventors: Rammohan Jagannathan, Chennai (IN); K. P. Balasubramanian, Chennai (IN)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 13/792,712

(22) Filed: Mar. 11, 2013

(65) Prior Publication Data

US 2014/0254432 A1 Sep. 11, 2014

(51) Int. Cl.
*H04L 12/28* (2006.01)
*H04L 12/24* (2006.01)
*H04L 12/931* (2013.01)

(52) U.S. Cl.
CPC ........ *H04L 41/0806* (2013.01); *H04L 41/0886* (2013.01); *H04L 49/00* (2013.01)

(58) Field of Classification Search
None
See application file for complete search history.

(56) References Cited

U.S. PATENT DOCUMENTS

| 7,835,363 | B2 * | 11/2010 | Lund et al. | 370/230 |
|---|---|---|---|---|
| 8,065,676 | B1 * | 11/2011 | Sahai et al. | 718/1 |
| 2004/0054780 | A1 * | 3/2004 | Romero | 709/226 |
| 2009/0210518 | A1 * | 8/2009 | Verma et al. | 709/220 |
| 2010/0287266 | A1 * | 11/2010 | Asati et al. | 709/222 |
| 2010/0312818 | A1 * | 12/2010 | Oman | 709/202 |

* cited by examiner

*Primary Examiner* — Donald Mills
(74) *Attorney, Agent, or Firm* — Haynes and Boone LLP

(57) ABSTRACT

A system and method for automatic provisioning of stacked switches includes entering a client state, setting one or more ports of the switch to normal mode, sending a first provisioning discover request on the one or more ports, receiving a first provisioning offer on a first port selected from the one or more ports, detecting whether the first provisioning offer is a full offer or a partial offer, entering a server state when the first provisioning offer is a full offer, entering a relay state when the first provisioning offer is a partial, and provisioning the switch based on information associated with the first provisioning offer.

20 Claims, 5 Drawing Sheets

```
stack-unit 410 provision mac-address M0
...
int 410/411
  stack port
  connected-unit 420
int 410/412
  stack port
  connected-unit 420
int 410/413
  stack port
  connected-unit 440
int 410/414
  stack port
  connected-unit 440
...
int 420/421
  stack port
  connected-unit 410
int 420/422
  stack port
  connected-unit 410
int 420/423
  stack port
  connected-unit 430
int 420/424
  stack port
  connected-unit 430
...
int 430/431
  stack port
  connected-unit 420
int 430/432
  stack port
  connected-unit 420
int 430/433
  stack port
  connected-unit 440
int 430/434
  stack port
  connected-unit 440
...
int 440/441
  stack port
  connected-unit 430
int 440/442
  stack port
  connected-unit 430
int 440/443
  stack port
  connected-unit 410
int 440/444
  stack port
  connected-unit 410
...
```

FIG. 5

SYSTEM AND METHOD FOR AUTOMATIC PROVISIONING OF STACKED SWITCHES

BACKGROUND

The present disclosure relates generally to information handling systems, and more particularly to automatic provisioning of stacked switches.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. This can be further complicated through other networking trends such as network virtualization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion using stacked switches. In a stacked switch, multiple network switching products are often grouped into a single switching entity that may allow each of the separate network switching products to be managed together as that single entity.

As network switching products become larger and more complex, the task of configuring or provisioning each of the network switching products may become more complex. In the case of stacked switches, both the individual network switching products and the stacked switch as a whole may need to be provisioned.

Accordingly, it would be desirable to provide improved network switching products that can be configured or provisioned in an automated fashion.

SUMMARY

According to one embodiment, a method of provisioning a switch includes entering a client state, setting one or more ports of the switch to normal mode, sending a first provisioning discover request on the one or more ports, receiving a first provisioning offer on a first port selected from the one or more ports, detecting whether the first provisioning offer is a full offer or a partial offer, entering a server state when the first provisioning offer is a full offer, entering a relay state when the first provisioning offer is a partial, and provisioning the switch based on information associated with the first provisioning offer.

According to another embodiment, a switch includes one or more ports; and one or more processors operating the switch in multiple states. The multiple states includes a server state, a relay state, and a client state. In the client state, the switch is configured to set the one or more ports to normal mode, send a first provisioning discover request on the one or more ports, receive a provisioning offer on a port selected from the one or more ports, detect whether the provisioning offer is a full offer or a partial offer, enter the server state when the provisioning offer is a full offer, and enter the relay state when the provisioning offer is a partial offer. The switch is further configured to provision itself based on information associated with the provisioning offer. The switch is part of a stacked switch.

According to yet another embodiment, an information handling system includes a stacked switch including one or more switches. Each of the switches includes one or more ports and one or more processors operating the respective switch in multiple states. The multiple states includes a server state, a relay state, and a client state. In the client state, the respective switch is configured to set the one or more ports to normal mode, send a first provisioning discover request on the one or more ports, receive a provisioning offer on a port selected from the one or more ports, detect whether the provisioning offer is a full offer or a partial offer, enter the server state when the provisioning offer is a full offer, and enter the relay state when the provisioning offer is a partial offer. The respective switch is further configured to provision itself based on information associated with the provisioning offer.

BRIEF DESCRIPTION OF THE DRAWINGS

FIG. 5 shows a simplified diagram of a configuration file for the stacked switch 400 of FIG. 4 according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
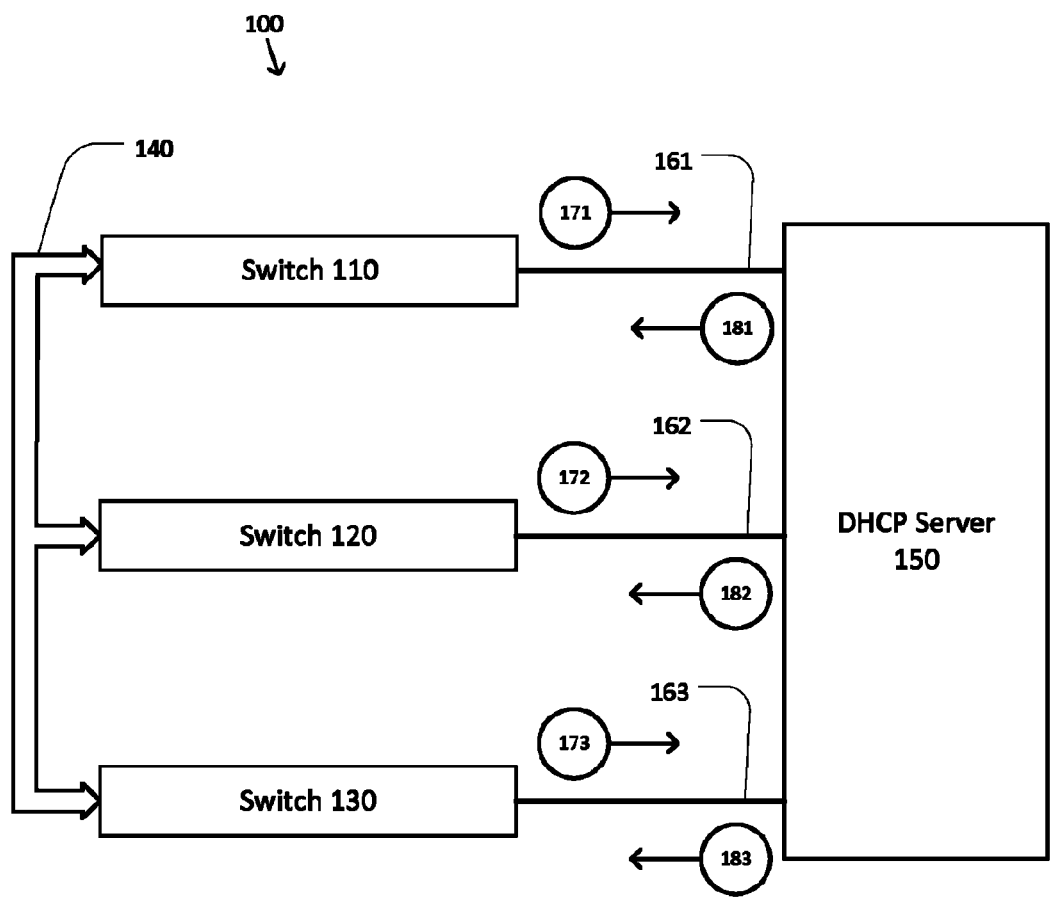
FIG. 1 shows a simplified diagram of a network supporting provisioning using DHCP according to some embodiments.

FIG. 1 shows a simplified diagram of a network 100 supporting provisioning using DHCP according to some embodiments. A network may include a plurality of network switching units or switches. As shown in the embodiment of FIG. 1, the representative network 100 includes three network switching units, switch 110, switch 120, and switch 130. The switches 110, 120, and 130 may be coupled together using a number of network links 140. Depending upon a desired topology of the network 100, the configuration of the network links 140 may vary significantly from one embodiment to another. In some embodiments, as more switches are added to the network 100, the configuration of the network links 140 may take on ever more varied arrangements and combinations. In some examples, the network links 140 may form a hub and spoke style arrangement among the switches. In some examples, the network links 140 may form a daisy chain arrangement among the switches. In some examples, the network links 140 may form any possible tree and/or graph among the switches. In some examples, the switches may be arranged in a highly parallel fashion. In some embodiments, some of the network links 140 may be used to form a stacked switch using all or some of the switches in the network 100. In some examples, each of the network links 140 that form the stacked switch may be operated in a special mode and may require additional headers in network packets forwarded using those network links 140.

As the number of switches in a network increase, it may no longer be practical to manually configure or provision the switches. During provisioning, each of the switches in the network may receive set-up or configuration information that inform the switch of its role in the network and its interconnections with other nearby switches. In some examples, the switch may be set-up so that it is part of a stacked switch and receive information regarding which of its communication ports are part of the stacking arrangement. In some examples, the switch may receive identification and/or address information such as an IP address. In some examples, the provisioning process may be supported by one or more communication protocols.

According to some embodiments, the Dynamic Host Configuration Protocol (DHCP) may be used to support the provisioning process. Under DHCP, each of the switches being provisioned by a DHCP server should have a direct network link between the switch and the DHCP server unless some type of relay mechanism is used. As shown in the embodiment of FIG. 1, the network 100 includes a DHCP server 150. Each of the switches 110, 120, and 130 has a direct network link to the DHCP server 150. Switch 110 is coupled to the DHCP server 150 using a network link 161, switch 120 is coupled to the DHCP server 150 using a network link 162, and switch 130 is coupled to the DHCP server 150 using a network link 163.

Each of the switches 110, 120, and 130 may receive its provisioning information directly from the DHCP server 150. Switch 110 may send a DHCP DISCOVER message 171 to the DHCP server 150 requesting provisioning information. The DHCP server 150 may respond to the DHCP DISCOVER 171 by returning a DHCP OFFER 181 to the switch 110. The DHCP OFFER 181 may provide provisioning information to the switch 110. In some examples, the DHCP OFFER 181 may include addressing information (e.g., an IP address) and/or the address of other servers in the network 100 (e.g., a DNS server). In some examples, the DHCP OFFER 181 may include a configuration file. In some examples, when the switch 110 is part of a stacked switch, the DHCP OFFER 181 may include configuration information related to the stacking. Similarly, the switch 120 and the DHCP server 150 may exchange a DHCP DISCOVER 172 and a DHCP OFFER 182, and the switch 130 and the DHCP server 150 may exchange a DHCP DISCOVER 173 and a DHCP OFFER 183.

According to some embodiments, the DHCP server 150 must be preconfigured before it can respond to the DHCP DISCOVERs 171, 172, and/or 173. In some examples, the DHCP server 150 may operate fairly autonomously and provide just addressing information from an address pool assigned to the DHCP server 150. In some examples, the DHCP server 150 may require extensive manual configuration by an operator. In some examples, the DHCP server 150 may be provided with one or more configuration files that may be returned as part of the DHCP OFFERs 181, 182, and/or 183.

Because of the requirement for a direct network link between the DHCP server 150 and the switches of a network (e.g., the switches 110, 120, and/or 130), support for DHCP in a network with a large number of switches may present some challenges or lead to some inefficiencies. In some examples, providing and maintaining a direct network link between each of the switches and a DHCP server may otherwise consume valuable network resources (e.g., switch ports and network link cabling) that could be otherwise used for other purposes during the majority of switch operation. In some examples, temporary cabling may be used during the provisioning process, but this may require dual sets of complex cabling and require manual installation and removal each time a switch is provisioned. In some examples, the use of DHCP relaying may alleviate some of these issues, but may still require that the DHCP server maintain separate provisioning information for each of the switches. Additionally, in some examples, each of the switches may have to dedicate ongoing resources to support DHCP relaying. Consequently, it would be advantageous to have improved methods for provisioning switches using DHCP.

Figure 2:
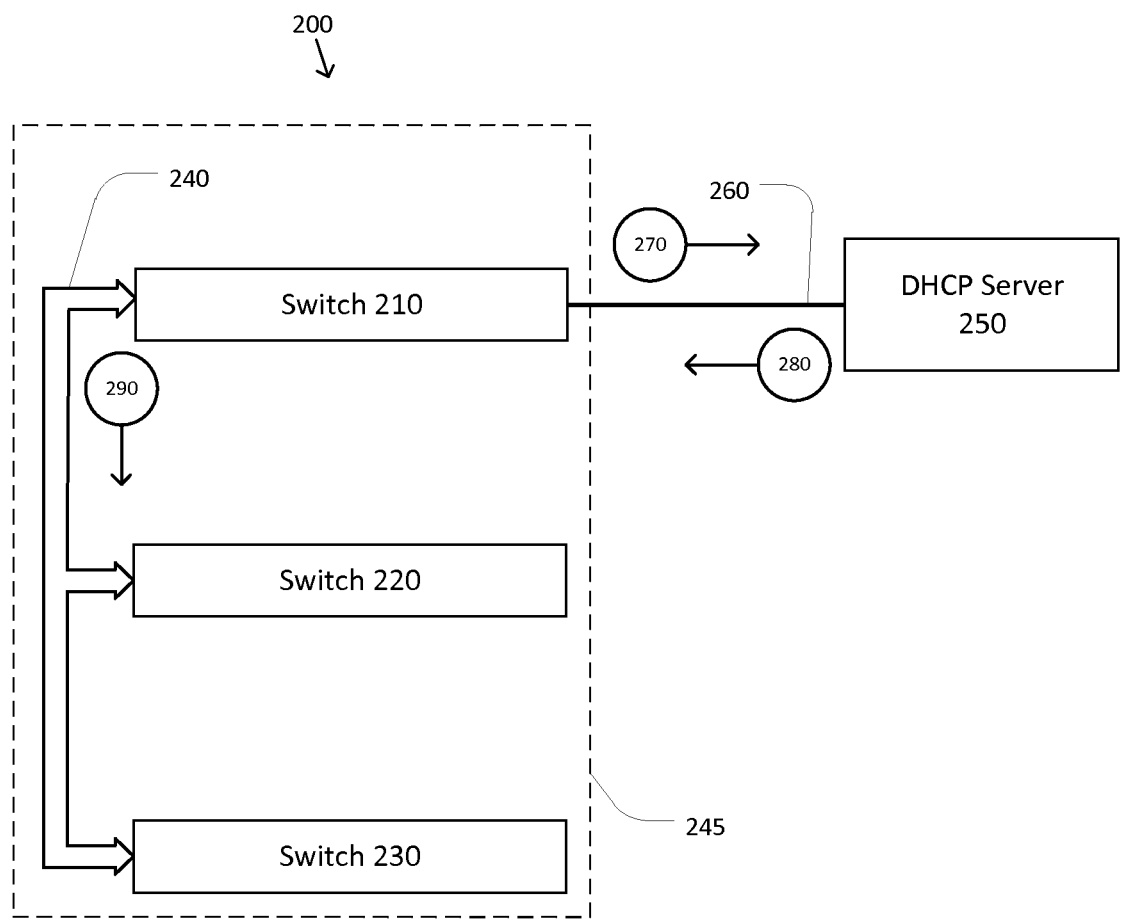
FIG. 2 shows a simplified diagram of another network supporting provisioning using DHCP according to some embodiments.

FIG. 2 shows a simplified diagram of a network 200 supporting provisioning using DHCP according to some embodiments. As shown in FIG. 2, the network 200 includes switches 210, 220, and 230. The switches 210, 220, and 230 are coupled using a plurality of network links 240 depending upon a desired topology of the network 200. In some examples, the switches 210, 220, and 230 may be part of a stacked switch 245. In contrast to the embodiment of FIG. 1, in the network 200, the DHCP server 250 is directly coupled only to switch 210 using the network link 260. In some examples, switch 210 may function as the master switch of the stacked switch 245. Because only switch 210 is directly coupled to the DHCP server 250, only switch 210 may provide a DHCP DISCOVER 270 to the DHCP server 250. And while it may be possible for the switch 210 to act as a DHCP relay to forward DHCP DISCOVERs from the switches 220 and/or 230 to the DHCP server 250, a single DHCP DISCOVER 270 may be used to request provisioning information for all of the switches in the stacked switch 245. As shown in FIG. 2, the DHCP server 250 responds to the DHCP DISCOVER 270 by providing a DHCP OFFER 280 that includes the provisioning information for the entire stacked switch 245. In some examples, the DHCP OFFER 280 may include a configuration file for the stacked switch as is described in further detail below with respect to FIG. 5. In some examples, the DHCP OFFER 280 may be a DHCP full OFFER. When the switch 210 receives the DHCP OFFER 280, it may forward all or portions of the provisioning information as one or more DHCP partial OFFERs 290 to the switches 220 and/or 230 using the network links 240.

Figure 3:
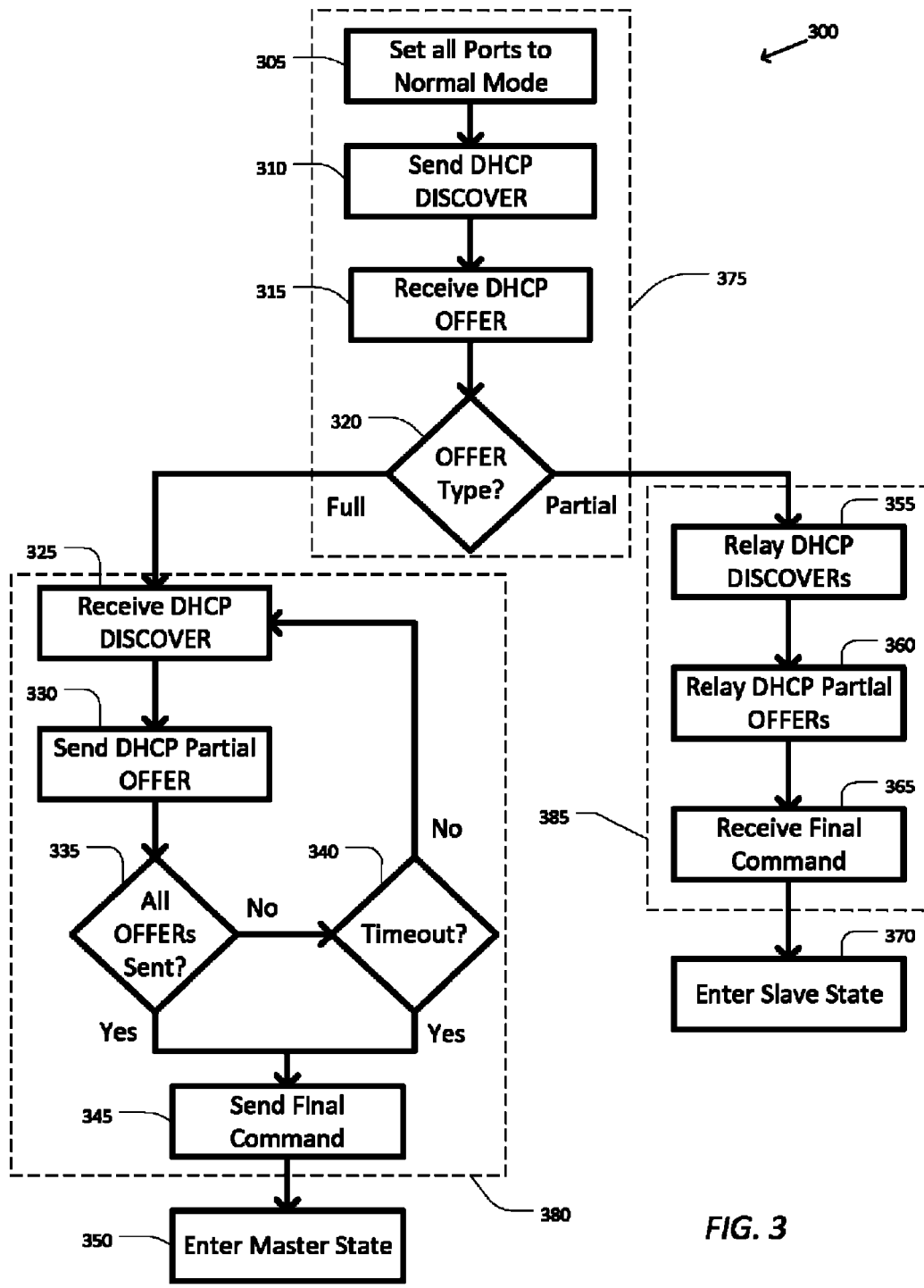
FIG. 3 shows a simplified diagram of a method of provisioning a stacked switch according to some embodiments.

FIG. 3 shows a simplified diagram of a method 300 of provisioning a stacked switch according to some embodiments. As shown in FIG. 3, the method 300 includes a process 305 for setting all ports to normal mode, a process 310 for sending a DHCP DISCOVER, a process 315 for receiving a DHCP OFFER, a process 320 for determining a type of the DHCP OFFER, a process 325 for receiving a DHCP DISCOVER, a process 330 for sending a DHCP partial OFFER, a process 335 for determining whether all the DHCP partial OFFERs have been sent, a process 340 for determining whether a timeout has occurred, a process 345 for sending a final command, a process 350 for entering a master state, a process 355 for relaying DHCP DISCOVERs, a process 360 for relaying DHCP partial OFFERs, a process 365 for receiving a final command, and a process 370 for entering a slave state. According to certain embodiments, the method 300 of provisioning a stacked switch can be performed using variations among the processes 305-370 as would be recognized by one of ordinary skill in the art. In some embodiments, one or more of the processes 305-370 of method 300 may be implemented, at least in part, in the form of executable code stored on non-transient, tangible, machine readable media that when run by one or more processors (e.g., one or more processors in the switches 210, 220, and/or 230) may cause the one or more processors to perform one or more of the processes 305-370.

According to some embodiments, the method 300 may be performed by a switch (e.g., the switch 210, 220, and/or 230) during a part of its provisioning process. In some examples, method 300 is performed as part of a rebooting process. In some examples, the switch must begin its provisioning process without knowing how it is connected into a network, whether it is part of a stacked switch, which of its ports are stacking ports, whether it is a master or slave switch in the stacked switch, and/or the location of any DHCP server. By default, the switch begins the provisioning process in a client state 375. According to some embodiments, the method 300 may be performed as part of bare metal provisioning (BMP).

At the process 305, the switch sets all of its ports to normal mode. Because the switch does not know anything yet about its configuration, it sets all of its ports to normal mode. In normal mode the ports will transmit and receive network packets using standard packet headers based on a type of the port. In some examples, the ports may be Ethernet ports and standard Ethernet packets may be sent and received.

At the process 310, the switch sends a DHCP DISCOVER. In some examples, the switch may use a DHCP client to send the DHCP DISCOVER. In some examples, the switch may send the DHCP DISCOVER in a repeating loop to all of its ports because it does not yet know the location of a DHCP server. In some examples, the switch may continue to send DHCP DISCOVERs until it receives a responding DHCP OFFER.

At the process 315, the switch receives a DHCP OFFER. In some examples, the DHCP OFFER may include a configuration file. In some examples, the switch may receive the DHCP OFFER directly from a DHCP server. In this case, the DHCP OFFER is a DHCP full OFFER and contains provisioning information for an entire stacked switch. In some examples, the switch may receive the DHCP OFFER from another switch. In this case, the DHCP OFFER is a partial OFFER and contains provisioning information for only a single switch.

At the process 320, the switch determines a type of the DHCP OFFER. DHCP messages, such as a DHCP OFFER may include many vendor specific and/or custom fields called options. The switch may examine one or more of the DHCP option fields (e.g., a partial option) to determine the type of the DHCP OFFER. In some examples, the DHCP option 230 may be used for the partial option. When the DHCP OFFER is received directly from the DHCP server, the partial option may be omitted and the switch may conclude that the DHCP OFFER is a DHCP full OFFER. When the DHCP OFFER is received from another switch, the partial option may be present and the switch may conclude that the DHCP OFFER is a DHCP partial OFFER. When the DHCP OFFER is a DHCP full OFFER, the switch may recognize that it is a master switch of the stacked switch and may enter a server state 380. When the DHCP OFFER is a DHCP partial OFFER, the switch may recognize that it is a slave switch of the stacked switch and may enter a relay state 385.

At the process 325, the switch may receive a DHCP DISCOVER. In some examples, the switch may become a DHCP server and take responsibility for provisioning the other switches in the stacked switch. In some examples, the switch may receive the DHCP DISCOVER from another switch that is still sending the DHCP DISCOVER as part of the another switch's process 310. In some examples, the switch may receive the DHCP DISCOVER from another switch that is relaying DHCP DISCOVERs as part of the another switch's process 355 as will be described in further detail below. In some examples, a DHCP option field (e.g., a relay option) may be used to identify a requesting switch that originated the DHCP DISCOVER during its process 310. In some examples, DHCP option 82 may be used to identify the requesting switch.

At the process 330, the switch sends a DHCP partial OFFER. The switch sends the DHCP partial OFFER as a response to the DHCP DISCOVER received during the process 325. In some examples, the switch may extract provisioning information corresponding to the requesting switch. In some examples, the corresponding provisioning information may be extracted from the provisioning information received in the DHCP full OFFER received during the process 315. In some examples, the DHCP partial OFFER may include the relay option using a DHCP option field as described above with respect to process 325.

At the process 335, the switch determines whether all of the DHCP partial OFFERs have been sent. In some examples, because the switch has knowledge of all of the switches in the stacked switch from the DHCP full OFFER it received during the process 315, the switch knows whether it has received a DHCP REQUEST and sent a corresponding DHCP partial OFFER to each of the switches in the stacked switch. When all of the DHCP partial OFFERs have been sent, the method 300 may continue at the process 345. When all of the DHCP partial OFFERs have not been sent, the method 300 may continue at the process 340.

At the process 340, the switch determines whether a timeout has occurred. In some examples, the switch may determine that too much time has elapsed and conclude that regular switch operation for the stacked switch should begin before all of the slave switches have received their DHCP partial OFFERs. In some examples, the timeout may be based on a timer started when the switch entered the server state 380. When the switch determines that the timeout has occurred, the method 300 may continue at the process 350. When the switch determines that the timeout has not occurred, the method 300 returns to the process 325 to wait for additional DHCP DISCOVERs.

At the process 345, the switch sends a final command. In some examples, the switch may send the final command to all of the slave switches in the stacked switch. The final command notifies the slave switches that regular stacked switch operation it so begin.

At the process 350, the switch enters a master state. As part of entering the master state, the switch sets all of its stacking ports into stacking mode based on the provisioning information found in the DHCP full OFFER received during the process 315. In some examples, the stacking mode may be a high gig or hg mode. In some examples, the switch may stop the DHCP server started during the process 325. In some examples, the switch may begin additional configuration tasks. In some examples, other regular switching operations may begin.

At the process 355, the switch relays DHCP DISCOVERs. As part of the relay state 385, the switch acts as a relay for other slave switches in the stacked switch that are not directly coupled with the master switch. In some examples, the switch may start a relay agent one or more of its ports. As the switch receives DHCP DISCOVERs it records the port on which they are received and forwards them. In some examples, the switch may forward the DHCP DISCOVERs using the port on which the switch received the DHCP partial OFFER during the process 315. In some examples, the DHCP DISCOVER may include a relay option with the identity of the port on which the DHCP DISCOVER was received using a DHCP option field as described above with respect to process 325.

At the process 360, the switch relays DHCP partial OFFERs. As the switch receives DHCP partial OFFERs in response to the DHCP DISCOVERs it sent during the process 355, the switch relays the DHCP partial OFFERs using the corresponding port the switch recorded during the process 355. In some examples, the DHCP partial OFFERs received may include a relay option with information about the port on which the DHCP partial OFFER should be relayed. In some examples, the relay option may be removed from the DHCP partial OFFER before it is forwarded.

At the process 365, the switch receives the final command. In some examples, the final command may be received directly from the master switch, which sent the final command during the process 345. In some examples, the final command may be received from another switch that forwarded the final command after the another switch received the final command in the another switch's process 365. In some examples, when the switch has relayed DHCP DISCOVERs and DHCP partial OFFERs during the processes 355 and 360, the switch may relay the final command to each of the switches it has sent a DHCP partial OFFER to.

At the process 370, the switch enters the slave state. As part of entering the slave state, the switch sets all of its stacking ports into stacking mode based on the provisioning information found in the DHCP partial OFFER received during the process 315. In some examples, the switch may stop the relay agent started during the process 355. In some examples, the switch may begin additional configuration tasks. In some examples, other regular switching operations may begin.

As discussed above and further emphasized here, FIG. 3 is merely an example, which should not unduly limit the scope of the claims. One of ordinary skill in the art would recognize many variations, alternatives, and modifications. According to some embodiments, a master switch may set its ports into stacking mode immediately after receiving the DHCP full OFFER during the process 315 rather than during the process 350. In some examples, this may reduce the configuration time for the stacked switch. According to some embodiments, a slave switch may set its ports into stacking mode immediately after receiving the DHCP partial OFFER during the process 315 rather than during the process 370. In some examples, this may reduce the configuration time for the stacked switch.

According to some embodiments, a slave switch may continue to send DHCP DISCOVERs on all of its other stacking ports even though it has already received a DHCP partial OFFER during the process 315 and entered the relay state 385. In some examples, sending the additional DHCP DISCOVERs on all of its other stacking ports and waiting for corresponding DHCP partial OFFERs on the corresponding stacking ports, may allow the slave switch to validate that all of its port wiring is correctly installed. In some examples, this may further eliminate the need for other validation protocols.

According to some embodiments, after the timeout during the process 340, a master switch may continue to receive DHCP DISCOVERs and send corresponding DHCP partial OFFERs, and slave switches may continue to relay DHCP DISCOVERs and DHCP partial OFFERs while keeping the stacking ports in normal mode. In some examples, this may allow the master and slave switches to continue with provisioning of the stacking information even though regular switch operations have begun during the processes 350 and/or 370.

According to some embodiments, a DHCP server may not be required to provision the stacking information. In some examples, as long as a master switch has knowledge of the provisioning information that would have been contained in a corresponding DHCP full OFFER, the provisioning of each of the slave switches may proceed without the DHCP server.

Figure 4:
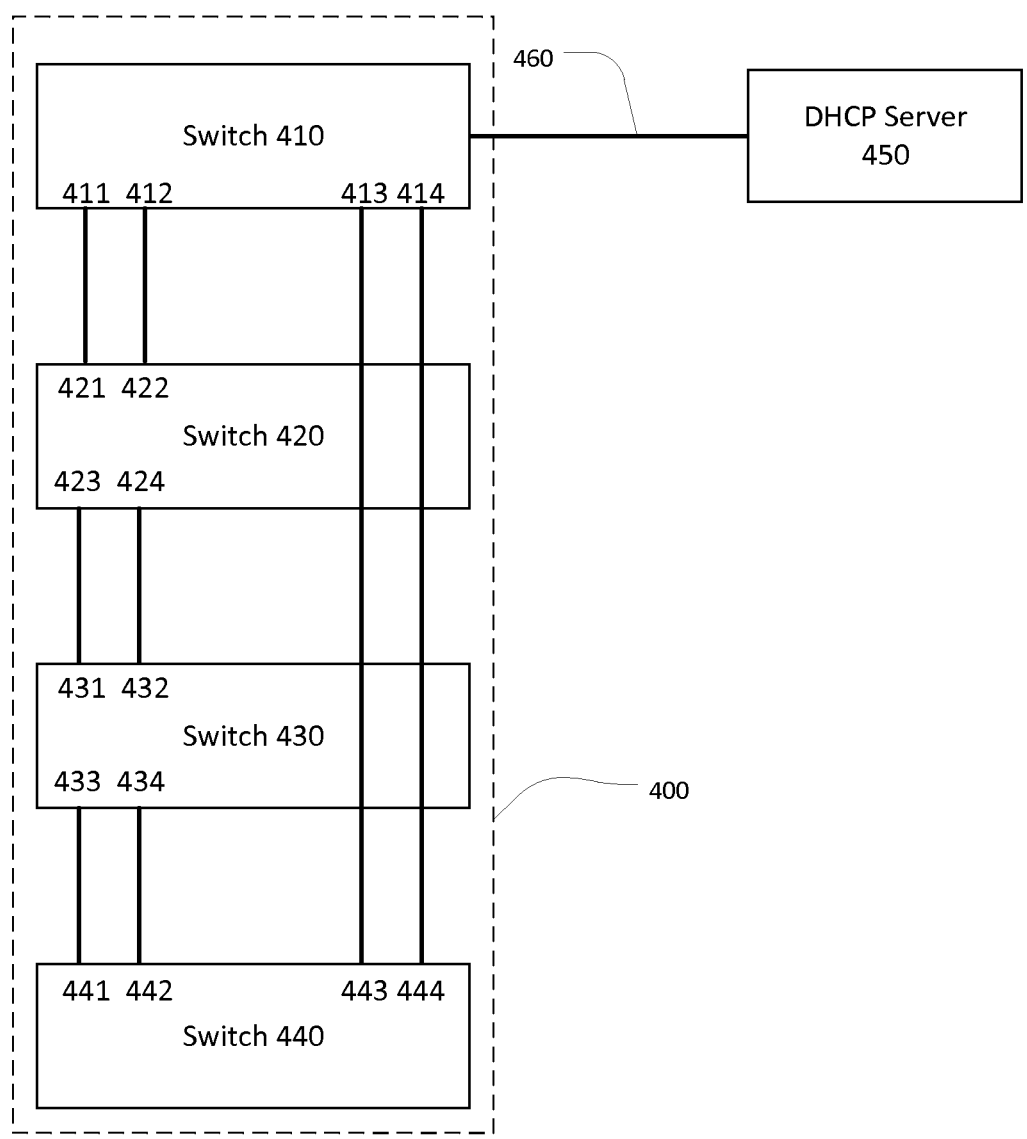
FIG. 4 shows a simplified diagram of a stacked switch that may be provisioned using the method of FIG. 3 according to some embodiments.

FIG. 4 shows a simplified diagram of a stacked switch 400 that may be provisioned using the method 300 of FIG. 3 according to some embodiments. As shown in FIG. 4, the stacked switch 400 is a representative example used merely to illustrate one application of the method 300. The stacked switch 400 includes four switches, switches 410, 420, 430, and 440. The switches 410, 420, 430, and 440 are arranged in a ring topology allowing the switches 410, 420, 430, and 440 to forward network traffic to other switches in one of two directions around the ring. Ports 411 and 412 couple the switch 410 to ports 421 and 422 of the switch 420, respectively. Ports 423 and 424 couple the switch 420 to ports 431 and 432 of the switch 430, respectively. Ports 433 and 434 couple the switch 430 to ports 441 and 442 of the switch 440, respectively. Ports 413 and 414 couple the switch 410 to ports 443 and 444 of the switch 440, respectively. In some examples, the ports 411-414, 421-424, 431-434, and 441-444 are stacking ports and may be provisioned accordingly.

A DHCP server 450 is coupled to the stacked switch 400 using a network link 460 between the DHCP server 450 and the switch 410. Because switch 410 is coupled to the DHCP server 450, it is the master switch of the stacked switch 410, and switches 420, 430, and 440 are slave switches. In some examples, the DHCP server 450 may be the DHCP server 250, the switch 410 may be the switch 210, and the switches 420, 430, and/or 440 may be any of the switches 220 and/or 230.

FIG. 5 shows a simplified diagram of a configuration file 500 for the stacked switch 400 of FIG. 4 according to some embodiments. As shown in FIG. 5, the configuration file 500 is a representative example used merely to illustrate one application of the method 300. The configuration file 500 includes provisioning information for the stacked switch 400, which includes provisioning information for each of the switches 410, 420, 430, and 440 as well as their corresponding stacking ports. The configuration file 500 may contain additional provisioning information as denoted by the ellipses. In some examples, the configuration file 500 may be stored in the DHCP server 450.

During provisioning, each of the switches 410, 420, 430, and 440 begins processing the method 300 by being in the client state 375. Each of the switches 410, 420, 430, and 440 places their respective ports 411-414, 421-424, 431-434, and 441-444 in normal mode and begins sending DHCP DISCOVERs on each of the respective ports 411-414, 421-424, 431-434, and 441-444 using the processes 305 and 310, respectively. Because switch 410 is the only switch directly coupled to the DHCP server 450, it is the only switch to receive a DHCP OFFER and it receives a DHCP full OFFER with the provisioning information in the configuration file 500, using the process 315. Switch 410 then enters the server state 380.

Once in the server state 380, switch 410 starts a DHCP server and begins receiving DHCP DISCOVERs, using the process 325, that the switches 420 and 440 are still sending using their processes 310. Switch 410 now receives a DHCP DISCOVER on port 411 that contains no relay option, so that switch 410 knows that the DHCP DISCOVER is being sent by switch 420. Switch 410 knows this because the configuration file 500 indicates that switch 420 is coupled to switch 410 using port 411. Switch 410 now sends a DHCP partial OFFER to switch 420 using port 411 using the process 330. The DHCP partial OFFER includes the partial option, a unit number for switch 420, and that ports 421 (connected to switch 410), 422 (connected to switch 410), 423 (connected to switch 430), and 424 (connected to switch 430) are stacking ports, as well as other DHCP provisioning information.

When switch 420 receives the DHCP partial OFFER, using the process 315, on port 410, it knows that it contains its own provisioning information because it includes the partial option and does not contain a relay option. Switch 420 now enters the relay state 385 and sets up a relay agent for ports 423 and 424. Switch 420 does not need to set up a relay agent for ports 421 and 422, because it knows these ports are coupled to its source of provisioning information based on the DHCP partial OFFER it just received.

Switch 410 now receives a DHCP DISCOVER on port 414 that contains no relay option, so that switch 410 knows that the DHCP DISCOVER is being sent by switch 440. Switch 410 knows this because the configuration file 500 indicates that switch 440 is coupled to switch 410 using port 414. Switch 410 now sends a DHCP partial OFFER to switch 440 using port 414 using the process 330. The DHCP partial OFFER includes the partial option, a unit number for switch 440, and that ports 441 (connected to switch 430), 442 (connected to switch 430), 443 (connected to switch 410), and 444 (connected to switch 410) are stacking ports, as well as other DHCP provisioning information.

When switch 440 receives the DHCP partial OFFER, using the process 315, on port 444, it knows that it contains its own provisioning information because it includes the partial option and does not contain a relay option. Switch 440 now enters the relay state 385 and sets up a relay agent for ports 441 and 442. Switch 440 does not need to set up a relay agent for ports 443 and 444, because it knows these ports are coupled to its source of provisioning information based on the DHCP partial OFFER it just received.

Switch 420 now receives a DHCP DISCOVER on port 423 using the process 355. Switch 420 forwards the DHCP DISCOVER on either port 421 or 422 after adding a relay option indicating that the DHCP DISCOVER was received on port 423 and including its own (switch 420's) unit number. When switch 410 receives the DHCP DISCOVER with the relay option, during the process 325, it deduces that the requesting switch is switch 430 based on the information in the relay option and its knowledge of the configuration file 500. Switch 410 now sends a DHCP partial OFFER back to switch 420 using the process 330. The DHCP partial OFFER includes the partial option, the relay option just received, a unit number for switch 430, and that ports 431 (connected to switch 420), 432 (connected to switch 420), 433 (connected to switch 440), and 434 (connected to switch 440) are stacking ports, as well as other DHCP provisioning information.

When switch 420 receives the DHCP partial OFFER, using the process 360, it strips off the relay option and forwards it to switch 430 using the port included in the relay option. When switch 430 receives the DHCP partial OFFER, using the process 315, on port 431, it knows that it contains its own provisioning information because it includes the partial option and does not contain a relay option. Switch 430 now enters the relay state 385 and sets up a relay agent for ports 433 and 434. Switch 430 does not need to set up a relay agent for ports 431 and 432, because it knows these ports are coupled to its source of provisioning information based on the DHCP partial OFFER it just received.

Switch 410 now realizes that it has sent DHCP partial OFFERs to all the other switches (i.e., switches 420, 430, and 440) in the stacked switch 400 using the process 335. Switch

410 then sends a final command to switches 420 and 440, sets the ports 411-414 to stacking mode, and enters the master state using the process 350.

When switch 420 receives the final command from switch 410, it forwards the final command to switch 430, sets the ports 421-424 to stacking mode, disables the relay agents on ports 423 and 424, and enters the slave state using process 370. When switch 440 receives the final command from switch 410, it sets the ports 441-444 to stacking mode, disables the relay agents on ports 441 and 442, and enters the slave state using process 370. When switch 430 receives the final command from switch 420, it sets the ports 431-434 to stacking mode, disables the relay agents on ports 433 and 434, and enters the slave state using process 370.

At this point, the stacked switch 400 is now provisioned, switch 410 is operating as a master switch, and switches 420, 430, and 440 are operating as slave switches. In addition, each of the stacking ports 411-414, 421-424, 431-434, and 441-444 have been set to stacking mode.

As discussed above and further emphasized here, FIGS. 4 and 5 are merely examples, which should not unduly limit the scope of the claims. One of ordinary skill in the art would recognize many variations, alternatives, and modifications. According to some embodiments, there may be fewer than four or more than four switches in the stacked switch 400. According to some embodiments, fewer than two or more than two ports may be used as stacking ports between any two switches in the stacked switch 400. According to some embodiments, topologies other than the ring are possible for the stacked switch 400. In some examples, the switches may have any type of tree and/or graph topology. According to some embodiments, provisioning information may have different formats and/or variations than the configuration file 500. According to some embodiments, the switches 410, 420, 430, and/or 440 may include many additional ports coupling the stacked switch 400 to other network switching units not shown.

Some embodiments of switches 210, 220, 230, 410, 420, 430, and 440 and the DHCP servers 250 and 450 may include non-transient, tangible, machine readable media that include executable code that when run by one or more processors may cause the one or more processors to perform the processes of method 300 as described above. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of provisioning a switch, the method comprising:
   entering a client state;
   setting one or more ports of the switch to normal mode;
   sending a first provisioning discover request on the one or more ports;
   receiving a first provisioning offer on a first port of the one or more ports in response to the first provisioning discover request;
   detecting whether the first provisioning offer is a full offer or a partial offer;
   entering a server state when the first provisioning offer is a full offer;
   entering a relay state when the first provisioning offer is a partial offer; and
   provisioning the switch based on information associated with the first provisioning offer.

2. The method of claim 1 wherein the first provisioning discover request is a DHCP DISCOVER and the first provisioning offer is a DHCP offer.

3. The method of claim 1 wherein when the first provisioning offer is received from a DHCP server, the first provisioning offer is a full offer.

4. The method of claim 1, further comprising when in the server state:
   receiving a second provisioning discover request; and
   sending a second provisioning offer in response to the second provisioning discover request;
   wherein the second provisioning offer is a partial offer.

5. The method of claim 4, wherein:
   the second provisioning discover request is received on a second port of the one or more ports; and
   the second provisioning offer is sent on the second port.

6. The method of claim 5 wherein the second provisioning offer includes information based on information associated with the first provisioning offer and the second port.

7. The method of claim 4 wherein the second provisioning offer includes information based on information associated with the first provisioning offer and information associated with a third port included in a relay option included in the second provisioning discover request.

8. The method of claim 4, further comprising when in the server state:
   determining whether each of one or more second switches identified in the first provisioning offer has been sent a corresponding second provisioning offer; and
   when each of the second switches has been sent a corresponding second provisioning offer, sending a final command to each of the second switches and entering a master state.

9. The method of claim 8 wherein entering the master state comprises setting one or more of the one or more ports to stacking mode based on information associated with the first provisioning offer.

10. The method of claim 8, further comprising when in the server state:
    determining whether a timeout has occurred; and
    when the timeout has occurred, sending a final command to each of the second switches and entering a master state.

11. The method of claim 10 wherein the timeout is started upon entering the server state.

12. The method of claim 1, further comprising when in the relay state:
    receiving a second provisioning discover request on a second port of the one or more ports; and
    relaying the second provisioning discover request using a third port of the one or more ports;
    wherein the third port couples the switch to a same server as the first port.

13. The method of claim 12 wherein the first port and the third port are the same.

14. The method of claim 12 wherein relaying the second provisioning discover request includes adding a relay option to the second provisioning discover request.

15. The method of claim 14 wherein the relay option includes information associated with the second port.

16. The method of claim 12, further comprising when in the relay state:
   receiving a second provisioning offer in response to the second provisioning discover request; and
   relaying the second provisioning offer using the second port;
   wherein the second provisioning offer is a partial offer.

17. The method of claim 16, further comprising when in the relay state, stripping a relay option from the second provisioning offer before relaying the second provisioning offer.

18. The method of claim 12, further comprising when in the relay state:
   receiving a final command; and
   entering a slave state.

19. A switch comprising:
   one or more ports; and
   one or more processors operating the switch in multiple states, the multiple states comprising:
      a server state;
      a relay state; and
      a client state, wherein in the client state, the switch is configured to:
         set the one or more ports to normal mode;
         send a first provisioning discover request on the one or more ports;
         receive a provisioning offer on a port of the one or more ports in response to the first provisioning discover request;
         detect whether the provisioning offer is a full offer or a partial offer;
         enter the server state when the provisioning offer is a full offer; and
         enter the relay state when the provisioning offer is a partial offer;
   wherein the switch is further configured to provision itself based on information associated with the provisioning offer;
   wherein the switch is part of a stacked switch.

20. An information handling system comprising:
   a stacked switch comprising:
      one or more switches, each of the switches comprising:
         one or more ports; and
         one or more processors operating the respective switch in multiple states, the multiple states comprising:
            a server state;
            a relay state; and
            a client state, wherein in the client state, the respective switch is configured to:
               set the one or more ports to normal mode;
               send a first provisioning discover request on the one or more ports;
               receive a provisioning offer on a port of the one or more ports in response to the first provisioning discover request;
               detect whether the provisioning offer is a full offer or a partial offer;
               enter the server state when the provisioning offer is a full offer; and
               enter the relay state when the provisioning offer is a partial offer;
            wherein the respective switch is further configured to provision itself based on information associated with the provisioning offer.

* * * * *